US011470376B2

(12) United States Patent
Caltabiano

(10) Patent No.: US 11,470,376 B2
(45) Date of Patent: *Oct. 11, 2022

(54) VEHICLE ENTERTAINMENT SYSTEM PROVIDING REMOTE USER CONTROL OF VIDEO CONTENT ON A MONITOR DISPLAY AND RELATED METHODS

(71) Applicant: VOXX INTERNATIONAL CORPORATION, Hauppauge, NY (US)

(72) Inventor: Joseph C. Caltabiano, Orlando, FL (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,206

(22) Filed: Oct. 21, 2021

(65) Prior Publication Data

US 2022/0046309 A1 Feb. 10, 2022

Related U.S. Application Data

(63) Continuation of application No. 16/733,469, filed on Jan. 3, 2020, now Pat. No. 11,190,830.

(60) Provisional application No. 62/789,154, filed on Jan. 7, 2019, provisional application No. 62/788,277, filed on Jan. 4, 2019.

(51) Int. Cl.
*H04N 21/422* (2011.01)
*H04N 21/41* (2011.01)
*H04N 21/4363* (2011.01)
*H04N 21/431* (2011.01)
(Continued)

(52) U.S. Cl.
CPC .... *H04N 21/4222* (2013.01); *H04M 1/72415* (2021.01); *H04N 21/4126* (2013.01); *H04N 21/41265* (2020.08); *H04N 21/4312* (2013.01); *H04N 21/43637* (2013.01); *H04N 21/4627* (2013.01)

(58) Field of Classification Search
CPC .......... H04N 21/4222; H04N 21/4126; H04N 21/41265; H04N 21/4312; H04N 21/43637; H04N 21/4627; H04N 21/41422; H04N 21/485; H04M 1/72415; H04M 1/6091
See application file for complete search history.

(56) References Cited

U.S. PATENT DOCUMENTS 6,678,892 B1   1/2004 Lavelle et al.
7,354,091 B2   4/2008 Lavelle et al.
(Continued)

*Primary Examiner* — Alazar Tilahun
(74) *Attorney, Agent, or Firm* — Allen, Dyer, Doppelt + Gilchrist, P.A.

(57) ABSTRACT

A vehicle entertainment system may include at least one vehicle video monitor configured to be mounted in the vehicle and including a monitor display and a monitor control interface permitting an adjacent user to control video content for the monitor display. The system may further include a mobile wireless device (MWD) to be carried by a remote user within the vehicle comprising an MWD display and circuitry associated therewith configured to obtain sampled video content being displayed on the monitor display, display the sampled video content on the MWD display, and provide a remote MWD control interface to permit the remote user to remotely control the video content on the monitor display.

20 Claims, 8 Drawing Sheets

(51) Int. Cl.
*H04N 21/4627* (2011.01)
*H04M 1/72415* (2021.01)

(56) References Cited

U.S. PATENT DOCUMENTS

| | | | |
|---|---|---|---|
| 8,713,613 | B2 | 4/2014 | Tranchina |
| 9,317,241 | B2 | 4/2016 | Tranchina |
| 9,621,615 | B2 * | 4/2017 | White ................... H04L 41/22 |
| 9,894,401 | B2 * | 2/2018 | Park .................. H04N 21/4122 |
| 9,998,818 | B1 | 6/2018 | Mitchell |
| 10,028,031 | B2 | 7/2018 | Tranchina et al. |
| 10,063,904 | B2 | 8/2018 | Morales et al. |
| 10,070,225 | B1 | 9/2018 | Mitchell |
| 10,432,997 | B2 | 10/2019 | Morales et al. |
| 10,860,192 | B2 * | 12/2020 | Feit ........................ B60K 37/06 |
| 2008/0040756 | A1 | 2/2008 | Perlman et al. |
| 2009/0304115 | A1 | 12/2009 | Pittaway et al. |
| 2011/0138416 | A1 | 6/2011 | Kang et al. |
| 2012/0256737 | A1 | 10/2012 | Park |
| 2014/0237518 | A1 | 8/2014 | Liu |
| 2014/0277937 | A1 * | 9/2014 | Scholz ................. H04L 67/025 |
| | | | 701/1 |
| 2016/0012795 | A1 * | 1/2016 | Banski .................. G09G 5/395 |
| | | | 345/520 |
| 2016/0100277 | A1 * | 4/2016 | Barabas ................. H04W 4/80 |
| | | | 455/41.3 |
| 2017/0118664 | A1 | 4/2017 | Lee |

* cited by examiner

VEHICLE ENTERTAINMENT SYSTEM PROVIDING REMOTE USER CONTROL OF VIDEO CONTENT ON A MONITOR DISPLAY AND RELATED METHODS

CROSS-REFERENCE TO RELATED APPLICATIONS

This application is a continuation of U.S. patent application Ser. No. 16/733,469, filed Jan. 3, 2020, and claims priority to U.S. provisional application No. 62/789,154 filed Jan. 7, 2019, and U.S. provisional application No. 62/788,227 filed Jan. 4, 2019, all of which are hereby incorporated herein in their entireties by reference.

TECHNICAL FIELD

The present invention relates to the field of vehicle systems, and, more particularly, to vehicle entertainment systems and related methods.

BACKGROUND

Vehicle entertainment systems (which are also referred to as in-car entertainment (ICE), in-vehicle infotainment (IVI) and rear seat entertainment (RSE) systems) typically include one or more video monitors including respective displays (e.g., LED, LCD, etc.) and associated hardware/software components to provide audio/video (A/V) streams for users at the various displays. A/V content may be played from various media sources, such as mobile electronic devices, DVD players, streaming services, etc.

One example RSE system is set forth in U.S. Pat. No. 10,432,997 to Morales et al., which is assigned to the present Applicant and hereby incorporated herein in its entirety by reference. This RSE system includes an access point and a second housing. The access point includes a first screen and input/output ports. The access point is included in a first housing. The second housing is separate from the first housing and includes a second screen. The access point is configured to display first content on the first screen and stream the first content displayed on the first screen to the second housing so that the first content is displayed on the first and second screens. The access point is further configured to receive second content from a mobile device, display the second content on the first screen and stream the second content displayed on the first screen to the second housing so that the second content is displayed on the first and second screens.

Despite the advantages of such configurations, further enhancements and features in vehicle entertainment systems may be desirable in some applications.

SUMMARY

A vehicle entertainment system may include at least one vehicle video monitor configured to be mounted in the vehicle and including a monitor display and a monitor control interface permitting an adjacent user to control video content for the monitor display. The system may further include a mobile wireless device (MWD) to be carried by a remote user within the vehicle including an MWD display and circuitry associated therewith configured to obtain sampled video content being displayed on the monitor display, display the sampled video content on the MWD display, and provide a remote MWD control interface to permit the remote user to remotely control the video content on the monitor display.

In an example embodiment, the sampled video content may comprise a series of screen shot images captured from the video content. In one implementation, the at least one vehicle video monitor comprises a plurality of vehicle video monitors, and the remote MWD control interface permits the remote user to remotely control sharing of the video content between the vehicle video monitors. By way of example, the remote MWD control interface may also permit the remote user to remotely control video sources, monitor power, image brightness, etc.

In embodiments where the at least one vehicle video monitor comprises a plurality of vehicle video monitors, the MWD may be further configured to select a given vehicle video monitor from which to receive the sampled video content. In an example implementation, the monitor display may have a video control menu thereon, and the circuitry may be configured to replicate the video control menu on the MWD display. In some embodiments, the video content may have at least one digital rights management (DRM) restriction associated therewith.

By way of example, the at least one vehicle video monitor may be configured to communicate with the MWD via a peer-to-peer wireless local area network (WLAN) link, a WLAN within the vehicle, etc. The at least one vehicle video monitor may be configured to be mounted on a seatback within the vehicle, for example.

A related method is for remotely controlling at least one vehicle video monitor configured to be mounted in a vehicle and including a monitor display and a monitor control interface permitting an adjacent user to control video content for the monitor display. The method may include using an MWD within the vehicle including an MWD display for obtaining sampled video content being displayed on the monitor display, displaying the sampled video content on the MWD display, and providing a remote MWD control interface to permit the remote user to remotely control the video content on the monitor display.

A related vehicle entertainment system may include a housing configured to be mounted in a vehicle, a monitor display carried by the housing, a monitor control interface carried by the housing and permitting an adjacent user to control video content for the monitor display, and circuitry coupled to the monitor display and the monitor control interface. The circuitry may be configured to sample video content being displayed on the monitor display, send the sampled video content to a mobile wireless device (MWD) to be carried by a remote user within the vehicle, and cooperate with the MWD to permit the remote user to remotely control the video content on the monitor display via the MWD.

A related non-transitory computer-readable medium for an MWD including an MWD display to be carried by a remote user within a vehicle is also provided. The vehicle may include at least one vehicle video monitor mounted in the vehicle and including a monitor display and a monitor control interface permitting an adjacent user to control video content for the monitor display. The non-transitory computer-readable medium may have computer executable instructions for causing the MWD to perform steps including obtaining sampled video content being displayed on the monitor display, displaying the sampled video content on the MWD display, and providing a remote MWD control interface to permit the remote user to remotely control the video content on the monitor display.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

Figure 1:
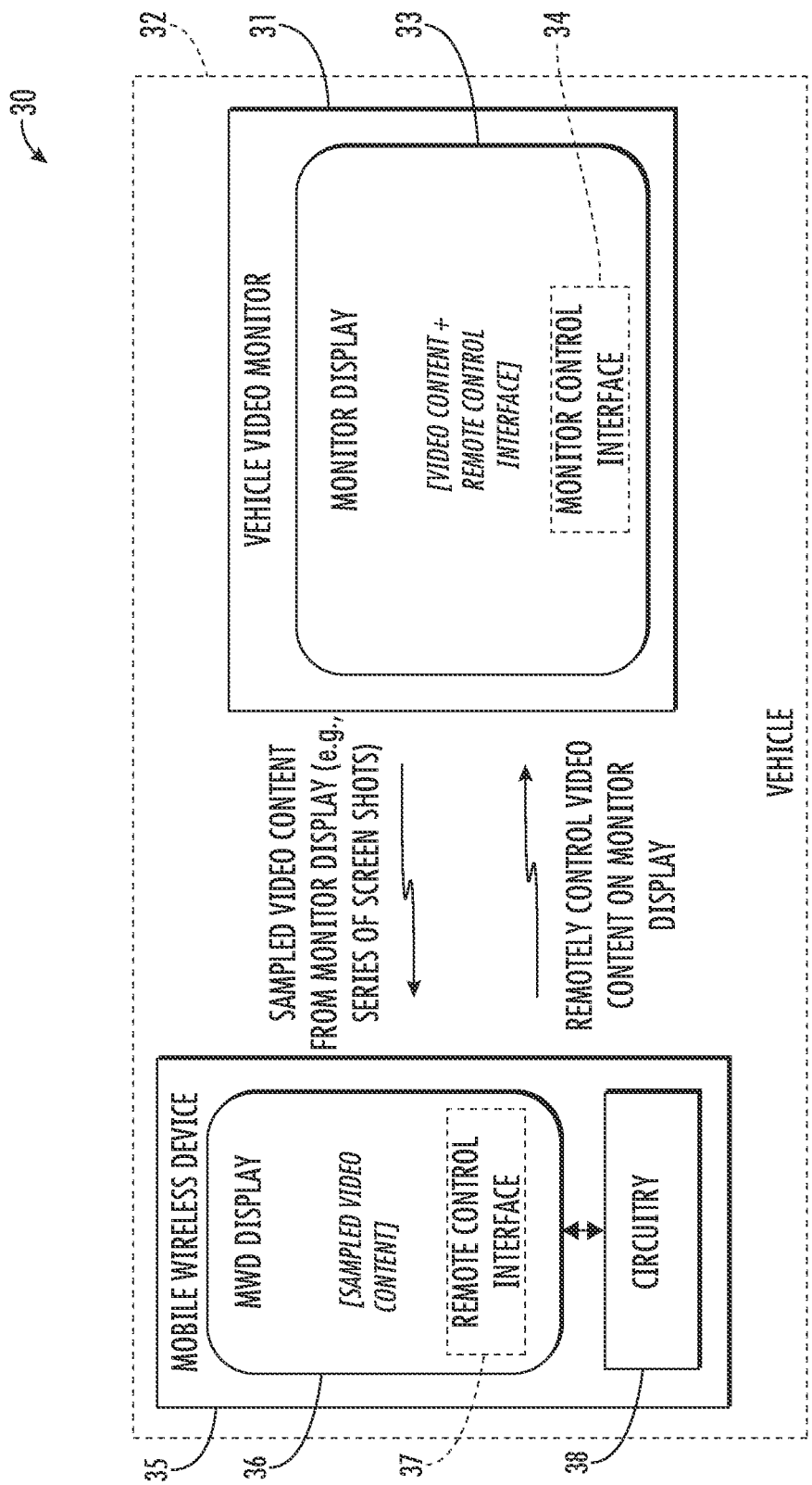
FIG. 1 is a schematic block diagram of a vehicle entertainment system providing remote control of a vehicle video monitor in accordance with an example embodiment.
Figure 2:
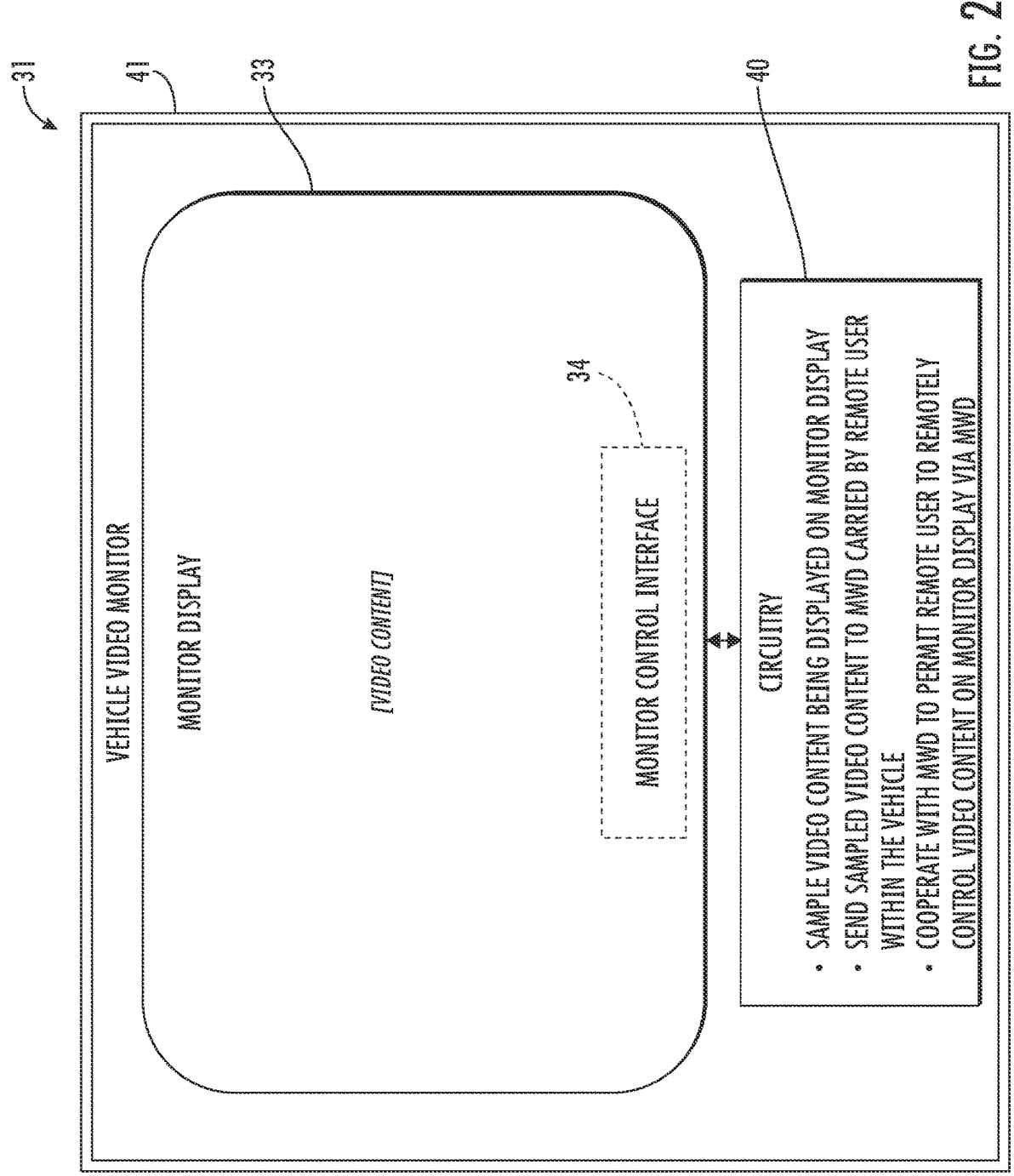
FIG. 2 is a schematic block diagram of an example vehicle video monitor which may be used with the vehicle entertainment system of FIG. 1.

Referring initially to FIGS. 1 and 2, a vehicle entertainment system 30 illustratively includes one or more vehicle video monitors 31 configured to be mounted in a vehicle 32. By way of example, the vehicle video monitor 31 may be incorporated within a vehicle seat headrest, may be mounted to a vehicle seatback, or may be a flip-down/overhead dropdown monitor that is mounted to a ceiling of the vehicle 32. In the illustrated example, the vehicle video monitor 31 illustratively includes a monitor display 33 and a monitor control interface 34. By way of example, the monitor display 33 may be an LCD, LED, OLED, or other suitable type of display. The monitor control interface 34 may be a touch screen interface allowing or permitting an adjacent user to control video content for the monitor display (e.g., the video source), as well as video playback options, for example.

The system 30 further illustratively includes a mobile wireless device (MWD) 35 to be carried by a remote user within the vehicle 32, which includes an MWD display 36 with associated remote control interface 37 and circuitry 38 associated therewith. By way of example, the MWD 35 may be a smartphone, tablet computer, laptop computer, etc. The circuitry 38 may include one or more of a wireless transceiver (e.g., WiFi/WLAN transceiver), microprocessor, and memory or non-transitory computer readable medium with computer-readable instructions for causing the circuitry to perform the various functions described herein.

More specifically, the circuitry 38 is configured to obtain sampled video content being displayed on the monitor display 33 of the vehicle video monitor 31, display the sampled video content on the MWD display 36, and provide the remote MWD control interface 37 to permit the remote user to remotely control the video content on the monitor display. Here again, the remote control interface 37 may be implemented as a touch screen interface which allows user touch input to be coordinated with different regions on the display 36 corresponding to different selection options, as will be appreciated by those skilled in the art.

In an example embodiment, the sampled video content may comprise a series of screen shot images captured from the video content. For example, the images may be screen shot images sent in microsecond increments, allowing the remote user of the MWD 35 to see in close to real time what is being represented on the system monitors.

In some embodiments, an application or app may be installed on the MWD 35, such as Android or iOS smart devices, which allow the MWD to connect to the vehicle video monitor(s) 31 through a wireless connection, such as a WiFi connection, for example. In one example configuration, upon connection the app will cause the MWD 35 to recognize the vehicle video monitor(s) 31 shortly after opening the app, allowing the user to select a given monitor to monitor and control. Command and control signals pass from the MWD 35 over the WiFi (or other suitable wireless) connection to the monitor(s) 31, and the monitor samples the screen shot images from the video content and sends them back to the MWD to provide for remote user visual monitoring of the monitor without the need to directly view the monitor display 33. In this configuration, the images sent to the smart device from the monitor 31 are not the identical video stream, but rather a series of screen shot image captures, which may in some instances be at a frequency less than the refresh or frame rate of the video content being displayed or streamed on the monitor display 33. The use of screen shot images may advantageously allow for remote monitoring and control from the remote and separate MWD 35 despite the presence of different digital rights management (DRM) formats which may be associated with different video sources or MWDs, for example.

To this end, the illustrated vehicle video monitor 31 also includes circuitry 40 which may cooperate with the monitor display 33 and monitor control interface 34 to perform the above-noted operations, including sampling of the video content, wirelessly sending the sampled video content to the MWD 35, and controlling video source and/or playback options responsive to the MWD. More particularly, the circuitry 40 may include a wireless (e.g., WiFi/WLAN) transceiver, microprocessor, audio/video circuitry, microprocessor(s), and associated memory/non-transitory computer-readable medium having computer-executable instructions for performing the operations described herein, for example, as will be appreciated by those skilled in the art. The various components of the monitor 31 are carried by a housing 41.

Referring additionally to FIGS. 3A-3C and 4-5, an example implementation of the system 30 in which the MWD 35 is a smartphone running an app as described above is now described. More particularly, in this example the app is referred to as "Voxx Link". Voxx Link is an app developed for Android and Apple smartphones and tablets that allows full remote control and visual monitoring of vehicle video monitors 31 without having to directly see or directly touch the monitors. This is a helpful tool to allow content selection and control of the monitors 31 for users who may be infants and toddlers (e.g., in a rear vehicle seat), too young to control the monitors themselves, by parents sitting elsewhere in the vehicle 32 (e.g., in the front passenger seat), for example.

The Voxx Link app may be downloaded and installed from the Google Play Store or the Apple app Store onto the desired Android or iOS device 35. If the monitors 31, and the MWD 35 with which the user wishes to control the monitors using Voxx Link, are not already connected to the same WiFi network, the monitor(s) and the intended controlling MWD may be connected to the same network. One example scenario uses a hotspot on the MWD 35 to establish internet/app access. Once the personal hotspot is turned on, the monitor(s) 31 may be connected to the hotspot of the MWD 35 through an on-screen menu (see FIG. 5). Once the monitor 31 and the MWD 35 are connected to the same network, the MWD will show as the connected device in the Voxx Link setup menu on the monitor display 33. In this setup scenario, the MWD 35 becomes the gateway to accessing the Internet/apps, and it also becomes the Voxx Link remote control for the monitor 31.

In accordance with another example implementation, a vehicle's built-in hotspot or a portable hotspot device are used to establish internet/app access. Upon turning on the hotspot, the vehicle video monitor(s) 31 are connected to the hotspot via WiFi as discussed above. Then the MWD 35 the user wishes to control the monitor(s) 31 with is connected with the hotspot through the device WiFi setup. Once the monitor(s) 31 and the MWD 35 are connected to the same network, the hotspot will show as the connected device in the Voxx Link setup menu on the monitor display 33. In this setup scenario, the hotspot becomes the gateway to accessing the Internet/apps, and it also becomes the network for the monitor(s) 31 and the Voxx Link controlling MWD 35.

Figure 3:
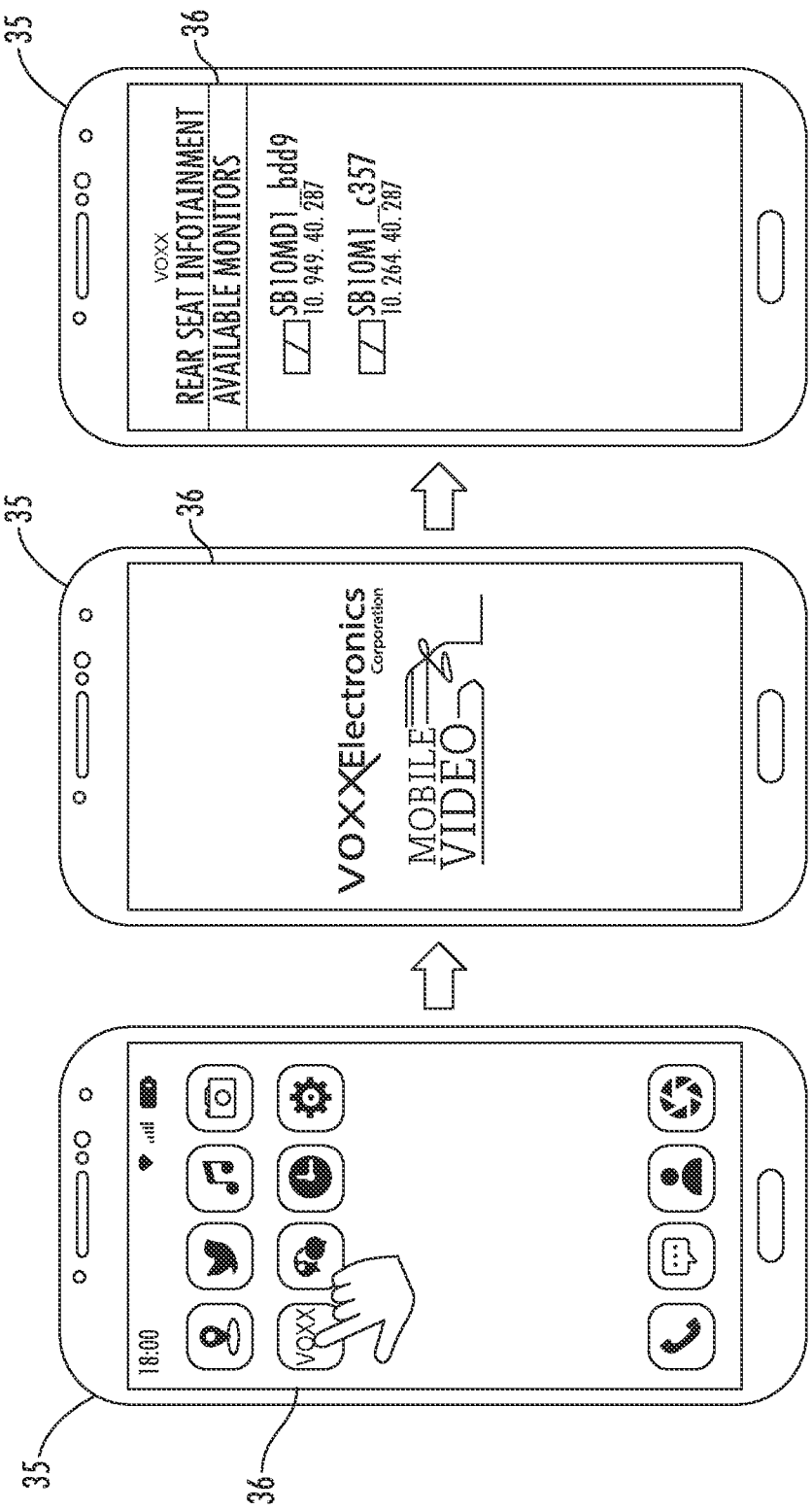
FIGS. 3A-3C are a series of front plan views of an example mobile wireless device selecting a vehicle video monitor to remotely control in the system of FIG. 1.
Figure 4:
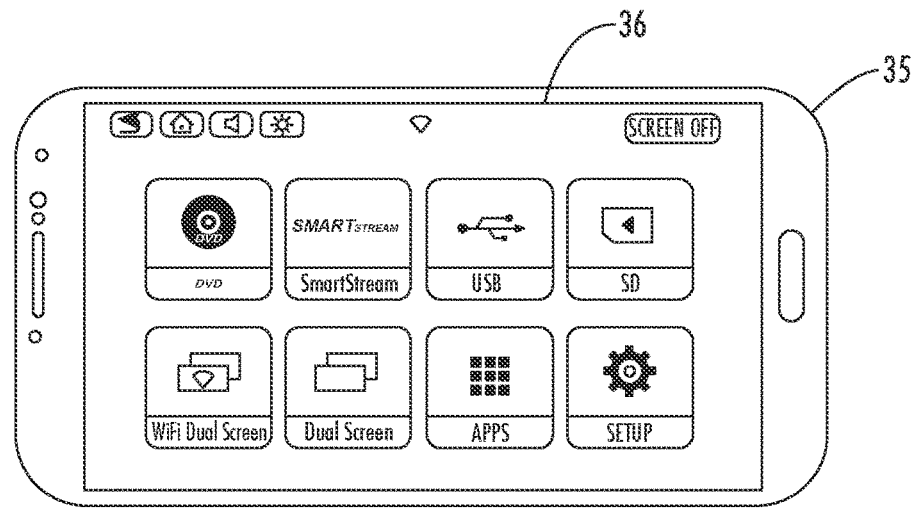
FIGS. 4 and 5 are front plan views of the mobile wireless device of FIG. 2 and an associated vehicle video monitor being remotely controlled, respectively.
Figure 5:
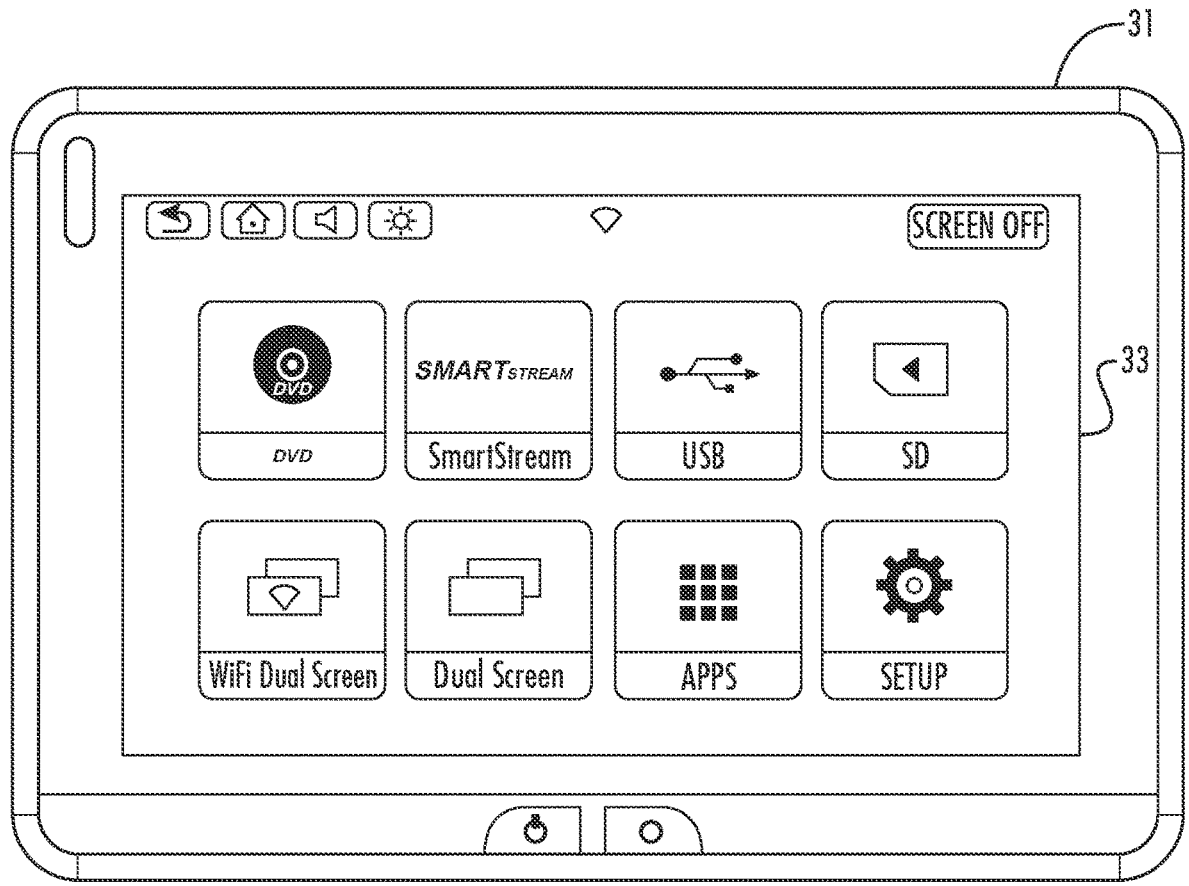
Figure 6:
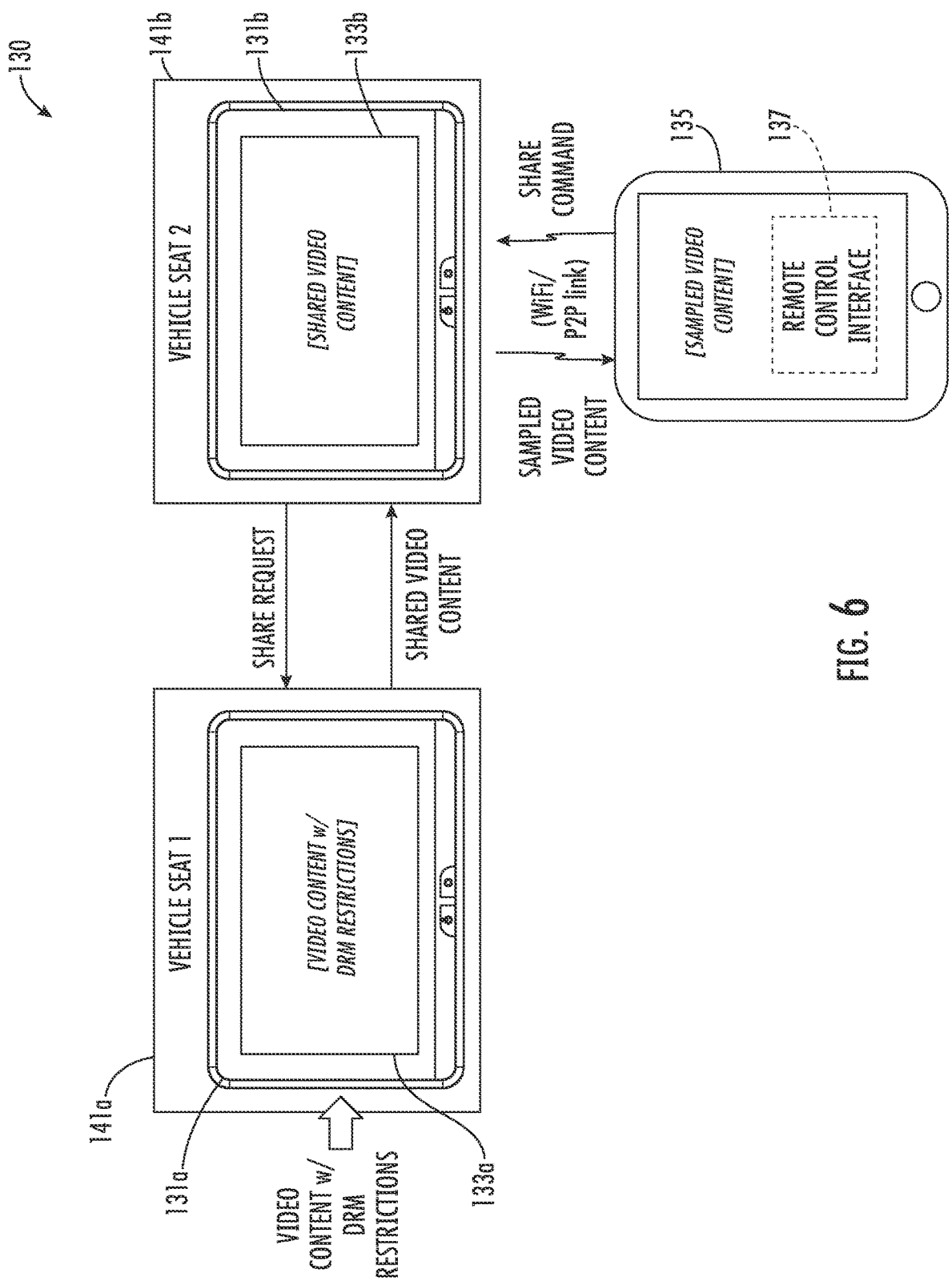
FIG. 6 is a schematic block diagram of another example implementation of the vehicle entertainment system of FIG. 1.

An example connection sequence for connecting the Voxx Link app to the monitor 31 to be controlled is shown in FIGS. 3A-3C. Once the wireless network connection is established between the MWD 35 and the monitors 31, the user opens the Voxx Link app (FIG. 3A). After the initial splash screen (FIG. 3B), the available monitors 31 (there are two in the present example, although other numbers of monitors may be present in different embodiments) will display under "Available Monitors" (FIG. 3C). The user selects the monitor 31 she wishes to control. Once selected, the monitor display 33 of the selected monitor 31 (FIG. 5) will appear on the MWD display 36 of the controlling MWD 35 (FIG. 4) (i.e., it will receive and display the sampled video content from the monitor 31). In the illustrated example, the circuitry 38 causes the video control menu shown on the monitor display 33 to be replicated on the MWD display 36, allowing the user of the MWD 35 to make the same control selections they would if touching the monitor display itself. To select a different monitor 31, the user may exit the home screen of the controlling MWD 35 and go back into the Voxx Link app to select a different monitor. In an example implementation, in the available monitor listing (FIG. 3C), the monitor 31 currently connected to the controlling device may be highlighted.

In another example configuration of a vehicle entertainment system 130, two vehicle video monitors 131a, 131b are provided which are mounted to respective seatbacks of vehicle seats 141a, 141b. In the example embodiment, the remote control interface 137 of the MWD 135 permits the remote user to remotely control sharing of the video content between the vehicle video monitors 131a, 131b. In the illustrated example, video content (which has DRM restrictions associated therewith) is received by the monitor 131a and played on the display 133a. As noted above, such content may come from various A/V sources including a streaming source, DVD, SD card, etc. In this case, the MWD 135 is connected with the monitor 131b and causes it to share the video content being displayed by the monitor 131a on its monitor display 133a, so that this same content will also be displayed on the monitor display 133b.

In accordance with an example implementation, the first monitor 131a may include the following components/features:

10.1" LED Backlit LCD Panel
Touch Screen Interface
Android operating system—Provides access to apps that users can download directly to the system.
Slot Load DVD Player with Auto On
USB Input—Playback of content in addition to charging support.
Micro SD Input—Playback of content.
Headphone Output—To allow connection of wired headphones.
Reset button—Reset system.
Eject button—Eject DVD.
Power Button—Turn system on and off.
Home Button
WiFi Screen Share—To allow transmission and reception of HD content between monitors so that both monitors can display the same content to users.
Dual Screen Share—Wired connection between monitors so that both monitors can display the same content to users (although a wireless connection may also be used in some embodiments).
OTA—Allows the ability to receive over the air updates to update system operation.
Remote App control—Apps developed for Android and iOS devices to remotely control the monitors in the system. The app allows full visibility and control of the monitors without having to see what is playing on the monitors. The app can control system settings in addition to source content selection.
SmartStream—Allows wireless content transfer from an Android device to the monitors.
FM Transmitter—100 channel FB transmitter.
IR Transmitter—Dual Channel Headphone Transmitter.

An example implementation of the second monitor 131b may include the following components/features:

10.1" LED Backlit LCD Panel
Touch Screen Interface
Android operating system—Provides access to apps that users can download directly to the system.
HDMI Input—Connectivity of external HDMI devices.
USB Input—Playback of content in addition to charging support.
Micro SD Input—Playback of content.
Headphone Output—To allow connection of wired headphones.
Reset button—Reset system.
Eject button—Eject DVD.
Power Button—Turn system on and off.
Home Button
WiFi Screen Share—To allow transmission and reception of HD content between monitors so that both monitors can display the same source content to users.
Dual Screen Share—Wired Composite Video Blanking and Sync (CVBS) connection (or wireless connection in some embodiments) between monitors so that both monitors can display the same source content to users.
OTA—Allows the ability to receive over the air updates to update system operation.

Remote App control—Apps developed for Android and iOS devices to remotely control the monitors in the system. The app allows full visibility and control of the monitors without having to see what is playing on the monitors. The app can control system settings in addition to source content selection.

SmartStream—Allows wireless content transfer from an Android device to the monitors.

FM Transmitter—100 channel FB transmitter.

IR Transmitter—Dual Channel Headphone Transmitter.

Of course, it will be appreciated that these are merely example configurations, and that other configurations and features may be used in different embodiments.

Figure 7A:
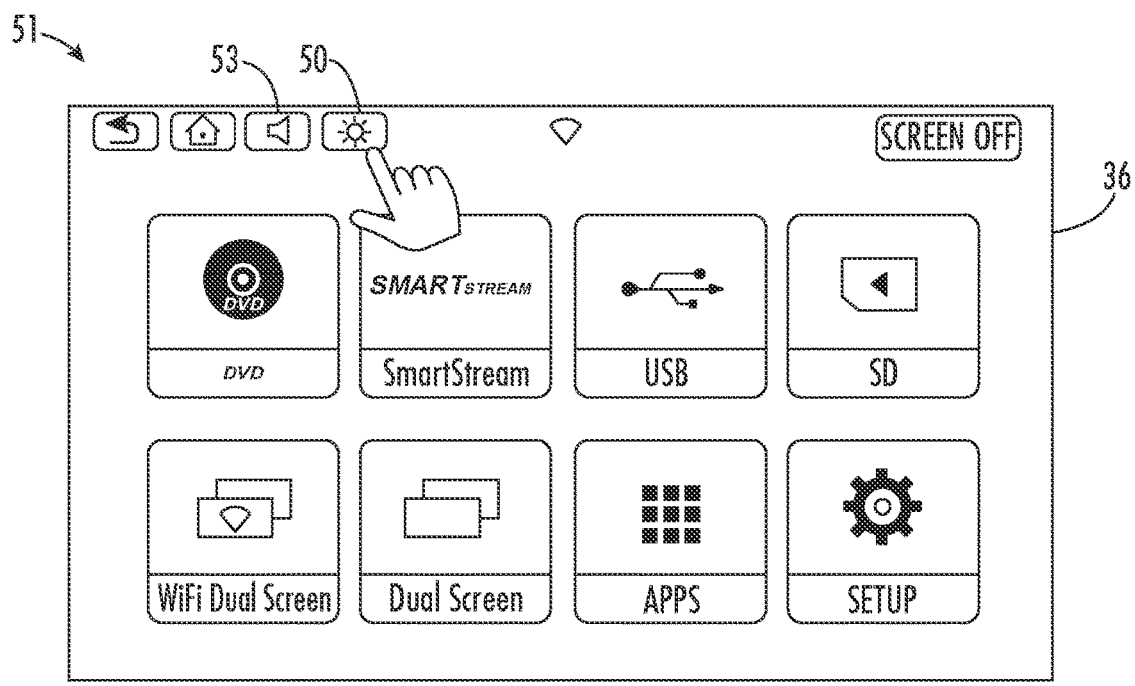
FIGS. 7A and 7B are a series of mobile wireless device screen shots illustrating remote control of image brightness of the vehicle video monitor of the vehicle entertainment system of FIG. 1 in accordance with an example embodiment.
Figure 7B:
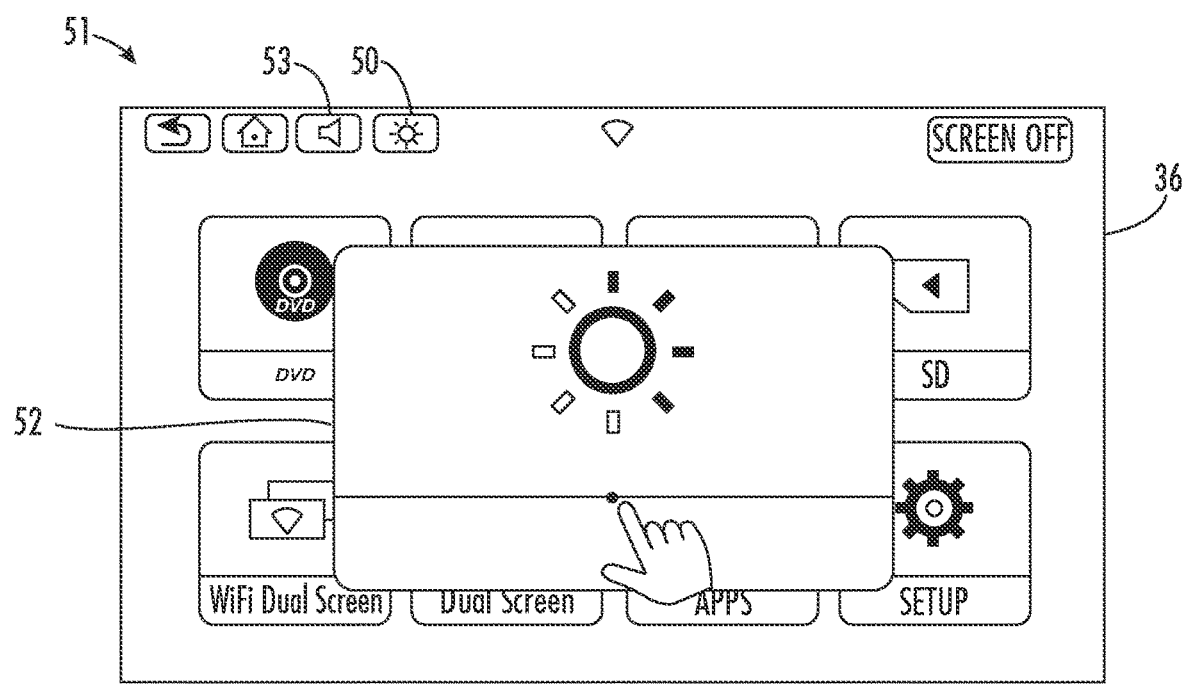

As noted above, the remote MWD control interface 37 may permit the remote user to remotely control various options such as video sources, monitor power, image brightness, etc. In the example illustrated in FIGS. 7A and 7B, from the video control menu replicated on the MWD display 36, the user may touch a brightness button 50 inside an info bar 51 to change the brightness setting via an overlay 52 that pops up on the display 36. The overlay 52 allows the user to touch and slide the brightness level indicator to the right to increase the brightness, and to the left to decrease the brightness in the illustrated example.

Figure 8A:
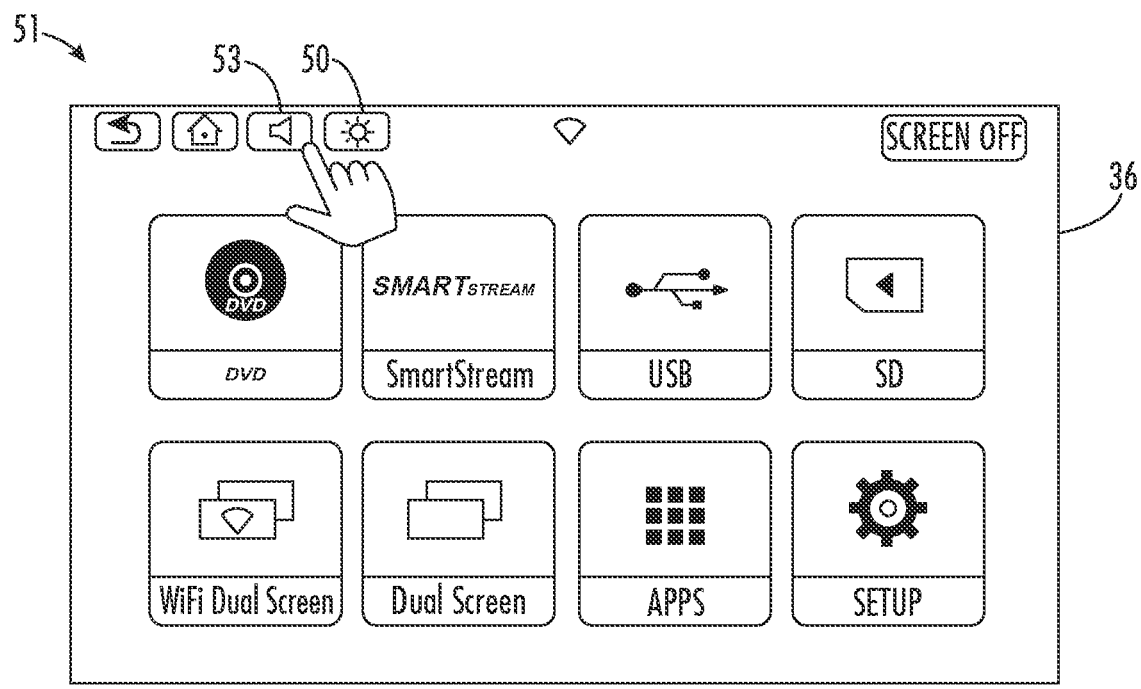
FIGS. 8A and 8B are a series of mobile wireless device screen shots illustrating remote control of audio volume of the vehicle video monitor of the vehicle entertainment system of FIG. 1 in accordance with an example embodiment.
Figure 8B:
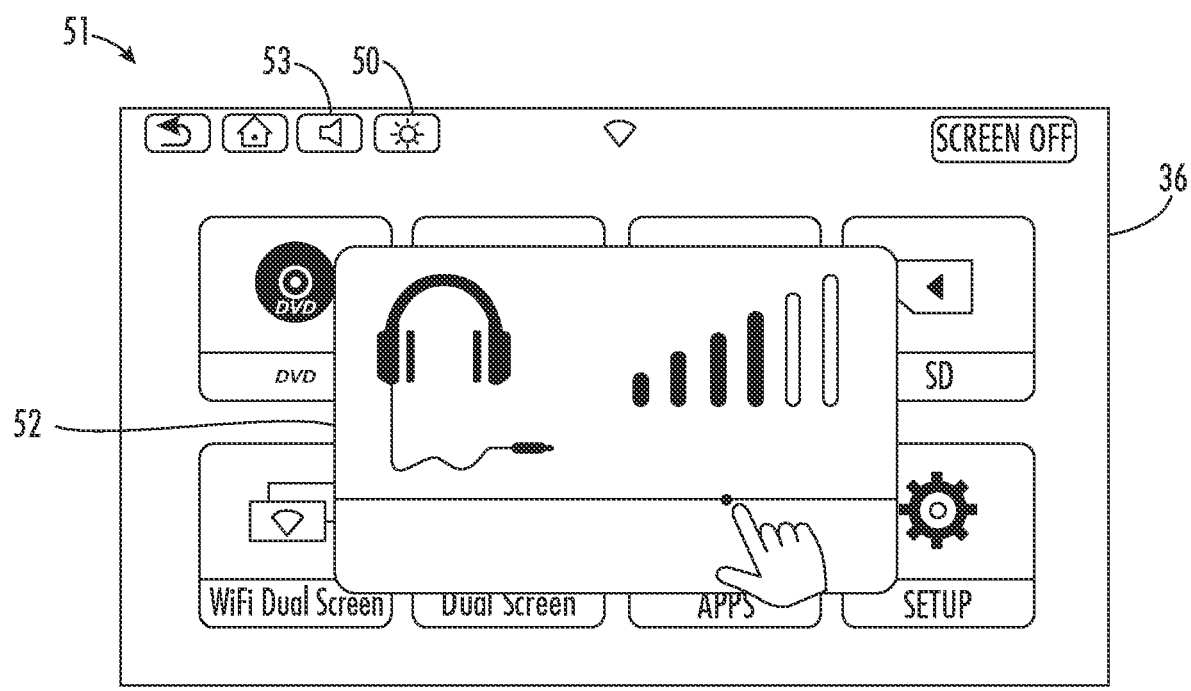

In the example illustrated in FIGS. 8A and 8B, from the video control menu replicated on the MWD display 36, the user may touch a volume button 53 inside the info bar 51 to change the volume via an overlay 54 that pops up on the display 36. The overlay 52 allows the user to touch and slide the volume level indicator to the right to increase the volume, and to the left to decrease the volume. Other similar A/V control functions may also be performed remotely by the MWD 35, as will be appreciated by those skilled in the art. Moreover, it should also be noted that more than one MWD 35 may be used to control the monitors 31 in some instances (e.g., both a user's smartphone and tablet computer may be connected to the monitors).

The above-described remote app control feature allows someone such as a parent (e.g., sitting in the front seat of a car) who cannot see the monitors 31 to connect to the monitors (e.g., up to 10 separate monitors/5 systems-one at a time), see what is on those monitors just like the direct user (e.g., the user facing the monitor while sitting in a rear seat of the car), and control those monitors without being in front of the actual monitor to interact with it directly. For example, the user might be a parent of a two year old that is strapped in a car seat and who cannot control the monitor 31 because he is either too young or physically cannot reach the monitor display 33 to control the monitor. The remote app control feature allows the parent to control the monitors 31 and select content to be played on the monitors from the front seats or elsewhere in the vehicle 32. In an example Voxx Link configuration, a user can control every aspect of the monitors 31 except for ejecting a DVD, Power On, Power Off (not to be confused with turning the screen image off), and once a monitor is placed into receiving mode (Wi-Fi Dual Screen or Dual Screen), the MWD 35 running the Voxx Link app can see what is playing on that receiving monitor but control is lost since that receiving monitor is being controlled from the transmitting monitor. However, in different configurations such control functions may be provided to the MWD 35 running the Voxx link app, if desired.

As noted above, the remote app functions such that sampled picture frames (e.g., page data) are sent over WiFi from the monitor 31 to the linked MWD 35. In an example embodiment, the monitor 31 is feeding its displayed image to the MWD 35 in millisecond increments, as noted above. When fed with such data, the picture image of the monitor display 33 is reproduced on the MWD 35, and thus, the user of the MWD may command and control the monitor with the MWD. For example, the user of the MWD 35 may stop a movie that is being played on the monitor 31 if it is inappropriate for young children. In addition, the user of the MWD 35 may select a new movie to be played on the monitor 31 that is more child appropriate.

Figure 9:
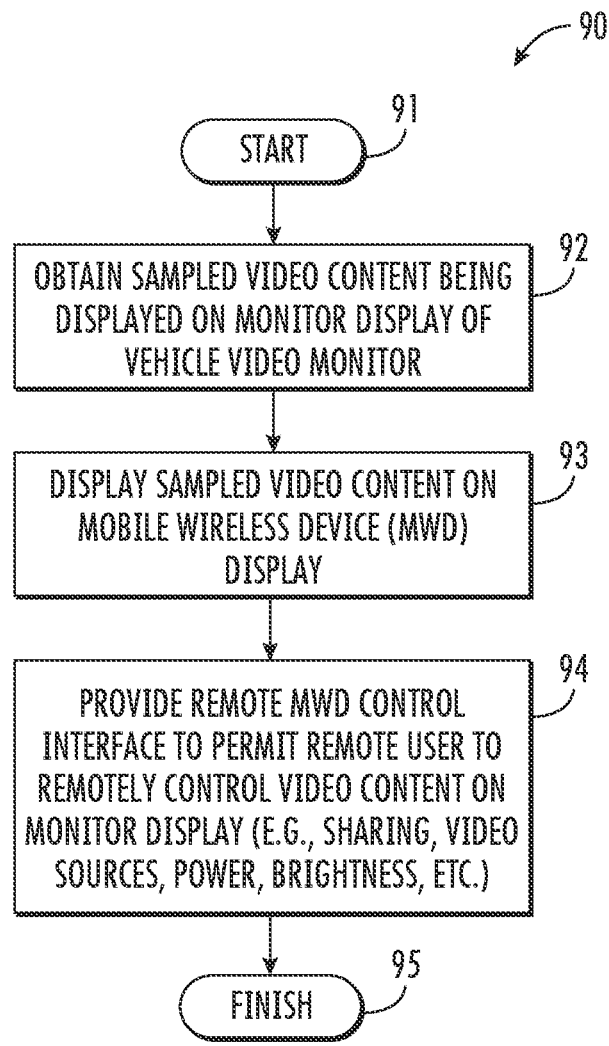
FIG. 9 is a flow diagram illustrating method aspects associated with the vehicle entertainment system of FIG. 1.

Turning to the flow diagram 90 of FIG. 9, a related method for remotely controlling one or more vehicle video monitors 31 is now described. Beginning at Block 91, the method illustratively includes using the MWD 35 within the vehicle 32 for obtaining sampled video content being displayed on the monitor display 33, at Block 92. The method further illustratively includes displaying the sampled video content on the MWD display 36 (Block 93), and providing a remote MWD control interface 37 to permit the remote user to remotely control the video content on the monitor display 33 (Block 94), as discussed further above. The method of FIG. 9 illustratively concludes at Block 95.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A vehicle entertainment system comprising:
    at least one vehicle video monitor configured to be mounted in the vehicle and comprising a monitor display and a monitor control interface permitting an adjacent user to control video content for the monitor display; and
    a mobile wireless device (MWD) to be carried by a remote user within the vehicle comprising an MWD display and circuitry associated therewith configured to
        obtain sampled video content being displayed on the monitor display, the sampled video content comprising a series of screen shot image captures of the displayed video content with a frequency different than a frame rate of the displayed video content,
        display the sampled video content on the MWD display, and
        provide a remote MWD control interface to permit the remote user to remotely control the video content on the monitor display.

2. The vehicle entertainment system of claim 1 wherein the at least one vehicle video monitor comprises a plurality of vehicle video monitors; and wherein the remote MWD control interface permits the remote user to remotely control sharing of the video content between the vehicle video monitors.

3. The vehicle entertainment system of claim 1 wherein the remote MWD control interface permits the remote user to remotely control video sources.

4. The vehicle entertainment system of claim 1 wherein the remote MWD control interface permits the remote user to remotely control monitor power.

5. The vehicle entertainment system of claim 1 wherein the remote MWD control interface permits the remote user to remotely control image brightness.

6. The vehicle entertainment system of claim 1 wherein the at least one vehicle video monitor comprises a plurality of vehicle video monitors; and wherein the MWD is further configured to select a given vehicle video monitor from which to receive the sampled video content.

7. The vehicle entertainment system of claim 1 wherein the monitor display has a video control menu thereon; and wherein the circuitry is configured to replicate the video control menu on the MWD display.

8. The vehicle entertainment system of claim 1 wherein the at least one vehicle video monitor is configured to communicate with the MWD via a peer-to-peer wireless local area network (WLAN) link.

9. The vehicle entertainment system of claim 1 wherein the at least one vehicle video monitor is configured to communicate with the MWD via a wireless local area network (WLAN) within the vehicle.

10. The vehicle entertainment system of claim 1 wherein the at least one vehicle video monitor is configured to be mounted on a seatback within the vehicle.

11. A method for remotely controlling at least one vehicle video monitor configured to be mounted in a vehicle and comprising a monitor display and a monitor control interface permitting an adjacent user to control video content for the monitor display, the method comprising:
using a mobile wireless device (MWD) within the vehicle comprising an MWD display for
obtaining sampled video content being displayed on the monitor display, the sampled video content being sampled from the video content comprising a series of screen shot image captures of the displayed video content with a frequency different than a frame rate of the displayed video content,
displaying the sampled video content on the MWD display, and
providing a remote MWD control interface to permit the remote user to remotely control the video content on the monitor display.

12. The method of claim 11 wherein the at least one vehicle video monitor comprises a plurality of vehicle video monitors; and wherein the remote MWD control interface permits the remote user to remotely control sharing of the video content between the vehicle video monitors.

13. The method of claim 11 wherein the remote MWD control interface permits the remote user to remotely control video sources.

14. The method of claim 11 wherein the at least one vehicle video monitor comprises a plurality of vehicle video monitors; and further comprising using the MWD for selecting a given vehicle video monitor from which to receive the sampled video content.

15. A vehicle entertainment system comprising:
a housing configured to be mounted in a vehicle;
a monitor display carried by the housing;
a monitor control interface carried by the housing and permitting an adjacent user to control video content for the monitor display; and
circuitry coupled to the monitor display and the monitor control interface and configured to
sample video content being displayed on the monitor display, the sampled video content being sampled from the video content comprising a series of screen shot image captures of the displayed video content with a frequency different than a frame rate of the displayed video content,
send the sampled video content to a mobile wireless device (MWD) to be carried by a remote user within the vehicle, and
cooperate with the MWD to permit the remote user to remotely control the video content on the monitor display via the MWD.

16. The vehicle entertainment system of claim 15 wherein the circuitry is configured to cooperate with the MWD to permit the remote user to remotely control video sources.

17. The vehicle entertainment system of claim 15 wherein the monitor display has a video control menu thereon; and wherein the circuitry is configured to cooperate with the MWD to display the video control menu on the MWD display.

18. A non-transitory computer-readable medium for a mobile wireless device (MWD) comprising an MWD display to be carried by a remote user within a vehicle, the vehicle comprising at least one vehicle video monitor mounted in the vehicle and comprising a monitor display and a monitor control interface permitting an adjacent user to control video content for the monitor display, the non-transitory computer-readable medium having computer executable instructions for causing the MWD to perform steps comprising:
obtaining sampled video content being displayed on the monitor display, the sampled video content being sampled from the video content comprising a series of screen shot image captures of the displayed video content with a frequency different than a frame rate of the displayed video content;
displaying the sampled video content on the MWD display; and
providing a remote MWD control interface to permit the remote user to remotely control the video content on the monitor display.

19. The non-transitory computer-readable medium of claim 18 wherein the at least one vehicle video monitor comprises a plurality of vehicle video monitors; and wherein the remote MWD control interface permits the remote user to remotely control sharing of the video content between the vehicle video monitors.

20. The non-transitory computer-readable medium of claim 18 wherein the remote MWD control interface permits the remote user to remotely control video sources.

* * * * *